United States Patent Office 3,419,351
Patented Dec. 31, 1968

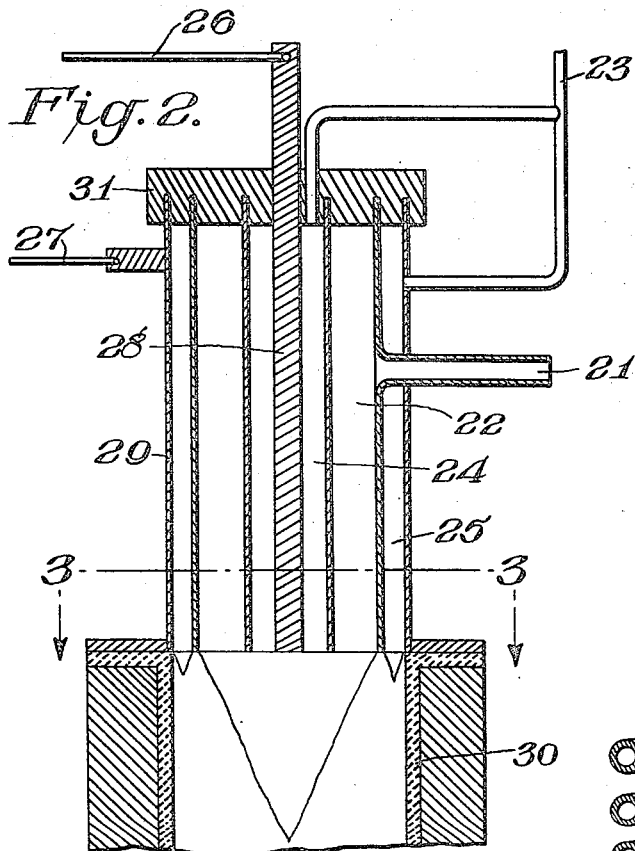
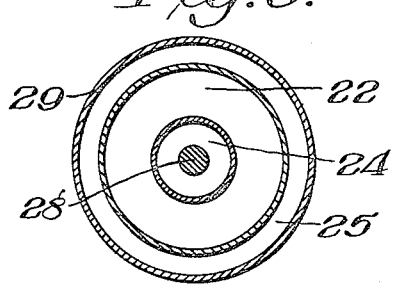
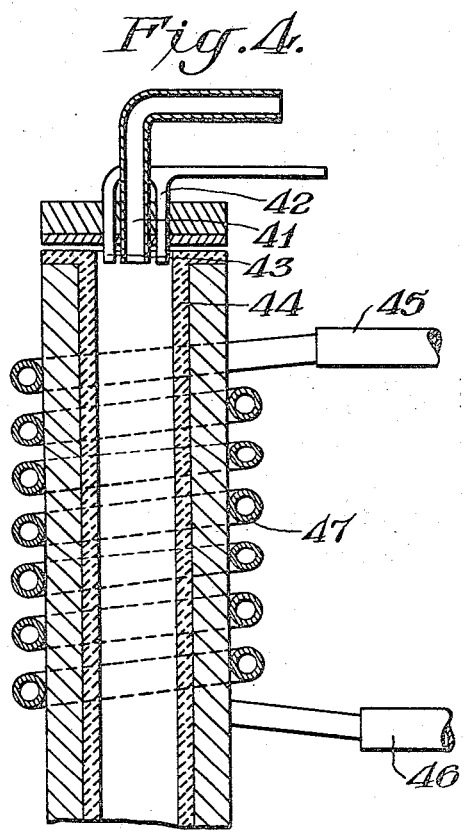

3,419,351
VAPOR PHASE PROCESS FOR THE CONVERSION OF METAL HALIDES INTO THEIR OXIDES
Hans Zirngibl, Duisburg, Walter Gutsche, Krefeld-Bocum, and Walter Weidmann, Duisburg-Mundelheim, Germany, assignors to Farbenfabriken Bayer Aktiengesellschaft, Leverkusen, Germany, a German corporation
Filed Aug. 21, 1963, Ser. No. 303,544
Claims priority, application Germany, Sept. 4, 1962, F 37,743
2 Claims. (Cl. 23—140)

ABSTRACT OF THE DISCLOSURE

Metal halides are converted into their oxides by reacting the halide vapors with oxygen, oxygen-containing gases or steam. The selected mixture is introduced into a reaction zone and the reaction is initiated by an auxiliary flame produced from an oxygen-containing combustible gas mixture. Heat is thereafter supplied to the reacting mixture by superimposition of the flame with a corona discharge or by producing high frequency alternating currents.

---

Figure 1:
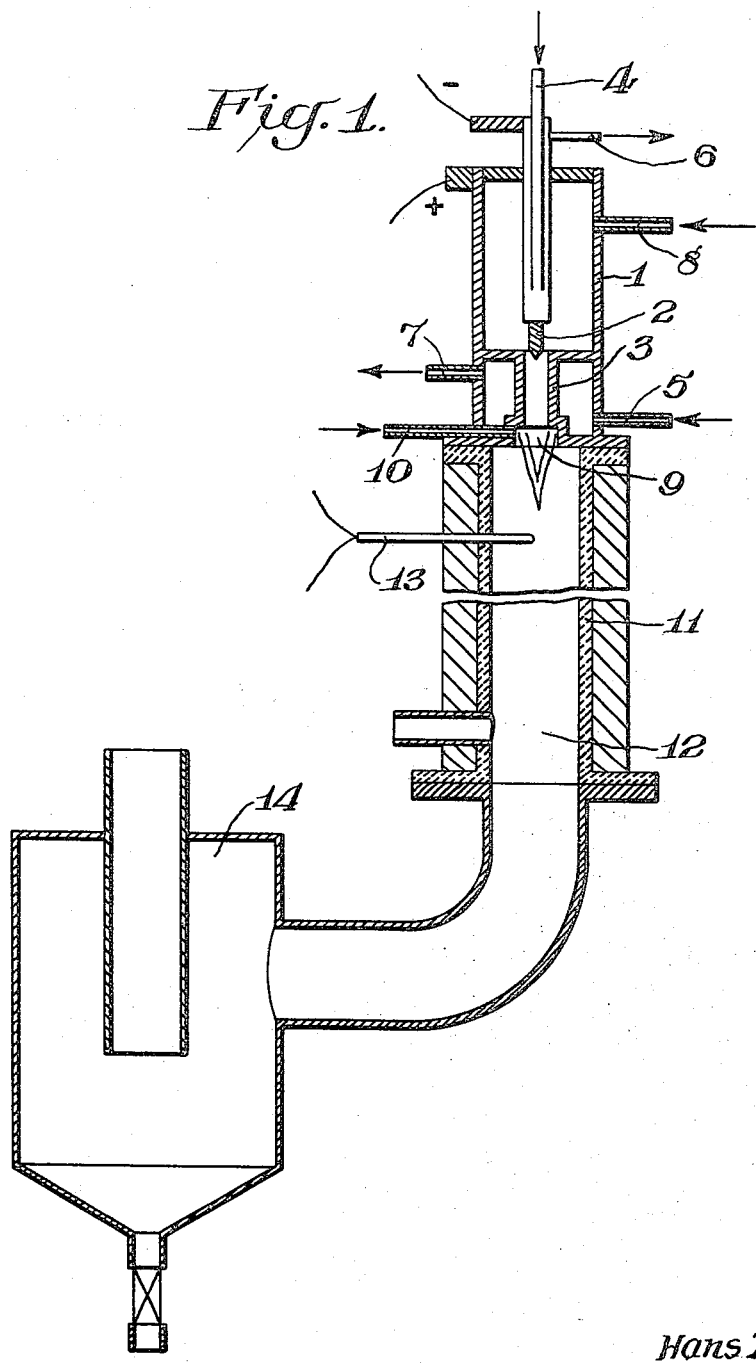

The present invention is concerned with the conversion of metal halides into their oxides and into halogen or hydrogen halides by reaction with oxygen or steam.

The known reactions of halides with oxygen or oxygen-containing gases at temperatures above about 800° C. or with steam at temperatures between about 300° C. and 1500° C. to form the corresponding metal oxides and halogens or hydrogen halides respectively are only weakly exothermic or even endothermic and, even in the exothermic reactions, the radiation of energy, especially by the hot oxide particles, generally exceeds the heat liberated by the reaction so that the reactions are not possible without the supply of additional energy.

The separate pre-heating of the reaction components to the necessary temperatures can be carried out only in ceramic apparatus, because of the aggressiveness of these materials to metals at high temperatures. However, these apparatus are, on the one hand, expensive and very fragile and, on the other hand, permit only a poor transmission of heat because of their low thermal conductivity.

The indirect heating of the reaction chamber itself, even by constructing the chamber walls as electrical heat conductors is also disadvantageous because the unavoidable incrustation of a part of the oxide particles on the walls impairs the transmission of heat to an increasing extent in the course of the reaction.

A further known method is the oxidation or hydrolysis of the halides in an auxiliary flame which provides the necessary additional energy. In this case, the reaction components, separately or pre-mixed and possibly pre-heated, are jet-sprayed in, parallel or vertically to the axis of the auxiliary flame.

For the reaction of the halides with oxygen or oxygen-containing gases, this process has two disadvantages. If, for the auxiliary flame, there is used a hydrogen-containing fuel from which steam is formed, then a part of the halogen corresponding to the amount of steam is converted into hydrogen halide. As a rule, however, the halogen should be recovered and possibly recycled for the production of fresh halides. Therefore, the part bound as hydrogen halide is to be regarded as lost. If, however, as has already been suggested, the auxiliary flame is supplied with carbon monoxide, then, because of its lower heat of combustion, a larger amount of this comparatively expensive auxiliary gas is necessary, involving considerable costs for this process.

A second disadvantage of the reactions promoted by an auxiliary flame is the dilution of the halogen obtained by the combustion gases, which makes the recovery of the halogen difficult. This dilution effect also applies to the hydrolysis reactions promoted by the combustion of auxiliary gas.

The carrying out of such reactions, especially the conversion of titanium tetrachloride into titanium dioxide pigments, in a moving bed has recently been suggested, whereby, before or during the reaction, the moving bed is pre-heated to 800–1000° C. indirectly or directly by auxiliary gas and maintained at this temperature.

Coarser particles of the oxide to be produced serve as the moving bed material. However, since newly formed oxide is deposited on the moving bed particles, a considerable amount of the oxide is lost for the use as pigment. The particles of the moving bed sometimes become even larger to such an extent that they lose their ability to flow. They must then be continuously removed and replaced by particles of smaller size. For the recovery of the titanium oxide thus lost for pigment purposes, it has been suggested to chlorinate again some of the separated coarse particles and thus to reduce their diameter to such an extent that they can be returned to the moving bed. The titanium tetrachloride thereby obtained is then returned to the oxidation zone.

The present invention is concerned with an especially advantageous process for the conversion of halides, such as calcium, magnesium, aluminum, silicon, tin, titanium, zirconium, chromium and iron halides, with oxygen or oxygen-containing gases or steam into their oxides and halogen or hydrogen halide respectively in the gaseous phase with the supply of heat, which is characterized in that electric energy is converted into heat in the reaction gases and/or in an inert auxiliary gas.

There are several possibilities for this new type of energy supply for the conversion of metal halides into their oxides. It can take place by an inert gas which is heated with the aid of an electric arc to very high temperatures and which is either mixed directly with the reaction components or serves as a source of radiation burning in the centre of the reactor.

The energy increase of the inert gas is not only due to a direct increase of the thermal energy (rotation, oscillation and translation of the molecules) but also to the fact that a certain amount of the molecules of the inert gas is dissociated or ionized by flowing through the electric arc and the corresonding energy is again liberated as heat by recombination of the fission products in the reactor. An inert gas heated in this manner is sometimes referred to as "plasma." Depending on the nature of the gas used and on the ratio of the electric energy to the amount of gas, it is possible to produce inert gas temperatures of up to 30,000° K. However, it is not possible to transfer the whole of the electric energy to the gas since a considerable amount of the energy, namely in general about 40–60%, is conducted away with the cooling water. For the present process, a "plasma" at a temperature between about 5000 and about 30,000° K., preferably between about 5000 and about 15,000° K. is expediently used.

The rare gases, as well as nitrogen, can serve as inert gases. Because of the cost and the better utilization of energy, nitrogen is preferred. The inert gas volume should only amount to a few percent of the exhaust gas volume. A noteworthy dilution of the exhaust gases does not occur.

The metal halide is expediently supplied to the reactor as gas but it is also possible to introduce it in solid or atomized liquid form.

Air can expediently be used as the oxygen-containing gas. On the other hand, it is also possible to work with pure oxygen or oxygen-enriched air, whereby a concentrated halogen is obtained as exhaust gas. Steam is blown in for the hydrolysis reaction.

A suitable device for the carrying out of this embodiment of the present invention is illustrated in FIGURE 1 of the accompanying drawings. An electric arc burns between the water-cooled tungsten cathode 2 and the tubular copper anode 3 which concentrically surrounds the cathode, in the metal apparatus surrounded by the cylindrical metal mantel 1. Both electrodes are water-cooled. The cooling water enters at 4 and 5 and leaves at 6 and 7. The inert gas is introduced at 8. The electric arc burning in the inert gas is extended by the inflowing cold gas, whereby the contact time of the gas in the arc is increased. The gas thereby takes up large amounts of energy and emerges from the anode channel at 9 as a hot, strongly luminous plasma. At this point, the reaction components entering at 10 are mixed with the plasma and brought to reaction. The reacting gases flow through the insulated tube reactor 11 consisting of ceramic material and are cooled to below 500° C. by cold gas blown in at 12, whereby a further growth of the oxide particles is prevented. The reaction temperature can be measured by the thermo-element 13. The oxide dust suspended in the exhaust gas is separated in the cyclone 14.

A second possibility of promoting, according to the present invention, the reaction of metal halides with oxygen-containing gases consists in the superimposition of the ignited reaction flame with an electric corona discharge which passes over between two suitably arranged electrodes. This type of discharge can be achieved in known manner by the provision of a sufficiently high voltage at the electrodes (direct or alternate voltage), as described, for example, in U.S. patent specification No. 3,004,137. Care is thereby to be taken that the discharge fills, as far as possible, the whole of the volume occupied by the flame and is not concentrated in a narrow band between the electrodes.

For the initiation and maintenance of the discharge, it is necessary that the reacting gases are sufficiently conductive. The conductivity of the gases depends upon the concentration of the charge carriers present in them, which can be adjusted to the desired value either by thermal ionization of the gas molecules themselves or by the introduction of readily ionizable materials in small amounts. As readily ionizable materials there are especially suitable alkali metals or their halides, which are mixed with the reaction components in vapour form.

FIGURES 2 and 3 of the accompanying drawings show a suitable device for carrying out the process according to the present invention by means of electric discharge. The pre-mixed reaction components, for example, metal halide and air, are introduced through the feed pipe 21 into the annular canal 22 and, upon their entry into the tube reactor 30, initially brought to reaction by an auxiliary flame which is fed via the feed pipe 23 and the annular canals 24 and 25 with an air-gas mixture, for example, carbon monoxide-air. When the reaction has commenced, a direct or alternate voltage of a few kv. is applied to the electrodes 28 and 29 through the cables 26 and 27, whereby a corona discharge is initiated. 28 and 29 are electrically separated by the insulation body 31 which, at the same time, serves as a stop plate. A current with a value of a few amperes then flows through the flame to which about 90–95% of the electric energy supplied is conveyed as heat. The supply of auxiliary gas can then be almost completely discontinued. The reacting gases flow through the insulated tube reactor 30. The further treatment of the reaction products corresponds to that described for FIGURE 1.

As mentioned above, the electric conductivity of flames can be increased by adding thereto traces of readily ionizable materials, such as alkali metal halides or alkali metals, with the proviso that the thermal energy of the flame is sufficient for the ionization of such materials. Gases rendered conductive in this manner can, similarly to other electrically conductive bodies, also be inductively heated by passing them through a ceramic, non-conductive tube which is surrounded by a coil through which flows an alternating current. In some cases, it is sufficient to obtain the conductivity necessary for the initiation of the induction by an auxiliary flame alone. FIGURE 4 of the accompanying drawings shows a suitable device for this purpose. The pre-mixed reaction components introduced at 41 are first brought to reaction by an auxiliary flame supplied via the tubes 42 and 43, the reaction proceeding in the insulated ceramic tube 44. The high frequency alternating current is then supplied via the leads 45 and 46 of the water-cooled tubular copper spiral 47. The supply of auxiliary gas is then interrupted and the reaction is maintained by the high frequency heating alone. The further treatment of the reaction products takes place as described for FIGURE 1 of the accompanying drawings.

Under certain circumstances, it can be advantageous for individual reactions to pre-heat the reaction components separately in an electro-magnetic alternating field and to mix them subsequently in suitable manner. An inert gas plasma of high energy content can also be produced in an alternating field which is then mixed with the reaction components as described above.

The following examples are given for the purpose of illustrating the present invention:

Example 1

The device illustrated in FIGURE 1 of the accompanying drawings was used. The plasma burner was run with a load of 15 kva. and 1.2 m.$^3$ of nitrogen per hour as working gas. The amount of energy taken up by the nitrogen amounts to 55%=7.65 kva.=6580 kcal. per hour, corresponding to 4.5 kcal./g. nitrogen.

To the mixing chamber there was supplied hourly: 77 mol of gaseous titaniumtetrachloride at 150–200° C. and 9.7 Nm.$^3$ of air at 20° C. The reaction temperature amounted to 1100–1200° C. and the exhaust gas temperature, after the admixture of cold gas to 485° C. As reaction products there was obtained: 5.9 kg. of titanium dioxide per hour (yield 95.7% of theory) and 12.6 Nm.$^3$ exhaust gas with a content of 27.3% chlorine, 2.3% oxygen, 70.4% nitrogen and traces of steam. The titanium dioxide obtained consisted of 98% of rutile, had a particle size of between 0.15 and 0.3 micron and a color strength of 1600 units on the Reynolds scale.

Example 2

In the device shown in FIGURE 2 of the accompanying drawings, the reaction of silicon tetrachloride with air was initiated with an auxiliary flame which was maintained by carbon monoxide and air. 3000 v. alternating voltage was then supplied to the electrodes and hourly 55 mol of gaseous silicon tetrachloride, together with 7.2 Nm.$^3$ air, introduced through the annular canal 22 into the reaction tube. A current of 1.6 a. thereby flowed. The introduction of the auxiliary gas was almost completely discontinued after the start of the reaction. The electrical load supplied amounted to 4.8 kva.=4120 kcal. per hour, the reaction temperature to 950–1050° C. and the exhaust gas temperature to 420° C. As reaction products there were obtained: 3.1 kg. of silicon dioxide per hour (yield 93.1% of theory) and 8.7 Nm.$^3$ exhaust gas per hour with a content of 28.0% chlorine, 3.5% oxygen, 67.5% nitrogen and traces of carbon dioxide and steam. The silicon dioxide obtained had a particle size range between 0.05 and 0.1 micron.

Example 3

In the device according to FIGURE 4 of the accompanying drawings, the reaction of magnesium chloride and steam to give magnesium oxide and hydrogen chloride was initiated by an auxiliary gas flame. A high frequency alternating current of 10 mHz. was then passed through the copper coil 46. The load of the high frequency generator was then brought to 6 kva. and the supply of auxiliary gas interrupted. 4.77 kg. of magnesium chloride, calculated an anhydrous product, were introduced hourly into the reaction tube as a suspension in 1 kg. of steam. The reaction took place at 1500° C. As reaction products there were obtained: 1.95 kg. of magnesium oxide (yield 91.5%) per hour and 2.4 Nm.³ exhaust gas per hour with a content of 5.5% water vapour and 94.5% hydrogen chloride.

We claim:

1. A process for the conversion of calcium, magnesium, aluminum, silicon, tin, titanium, zirconium, chromium or iron halides into their oxides by reacting a mixture of a halide and a member selected from the group consisting of oxygen, oxygen-containing gases and steam which comprises the steps of introducing the selected mixture into a reaction zone, initiating the reaction thereof by an auxiliary flame produced from an oxygen-containing combustible gas mixture, thereafter supplying heat to said mixture in said reaction zone by the superimposition of the auxiliary flame with a corona discharge and recovering resulting reaction products.

2. A process for the conversion of calcium, magnesium, aluminum, silicon, tin, titanium, zirconium, chromium or iron halides into their oxides by reacting a mixture of a halide and a member selected from the group consisting of oxygen, oxygen-containing gases and steam which comprises the steps of introducing the selected mixture into a reaction zone, initiating the reaction of the mixture by an auxiliary flame produced from an oxygen-containing combustible gas mixture, thereafter supplying heat to said mixture in said reaction zone by producing high frequency alternating currents and recovering resulting reaction products.

References Cited

UNITED STATES PATENTS

| Patent No. | Date | Name | Class |
|---|---|---|---|
| 3,004,137 | 10/1961 | Karlovity | 204—164 X |
| 3,375,408 | 9/1966 | Winterburn | 23—182 |
| 3,275,412 | 9/1966 | Skrivan | 23—202 |
| 3,275,411 | 9/1966 | Freeman et al. | 23—202 |
| 2,347,496 | 4/1944 | Muskat et al. | 23—182 |
| 2,823,982 | 2/1958 | Saladin et al. | 23—182 |
| 2,858,411 | 10/1958 | Gage | 219—121 |
| 3,042,830 | 7/1962 | Orbach | 219—121 |
| 3,051,639 | 8/1962 | Anderson | 204—171 |
| 3,069,281 | 12/1962 | Wilson | 23—140 |
| 3,114,691 | 12/1963 | Case | 204—164 X |
| 3,254,958 | 6/1966 | Margiloff | 23—219 |

EARL C. THOMAS, *Primary Examiner.*

H. T. CARTER, *Assistant Examiner.*

U.S. Cl. X.R.

23—182, 186, 144, 145, 200, 201, 202; 204—164